US006279652B1

(12) United States Patent
Chatterji et al.

(10) Patent No.: US 6,279,652 B1
(45) Date of Patent: *Aug. 28, 2001

(54) HEAT INSULATION COMPOSITIONS AND METHODS

(75) Inventors: Jiten Chatterji; David D. Onan, both of Duncan; Roger S. Cromwell, Walters, all of OK (US)

(73) Assignee: Halliburton Energy Services, Inc., Duncan, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,286

(22) Filed: Sep. 23, 1998

(51) Int. Cl.[7] ............................. C08J 9/32; E21B 23/00; E21B 33/12

(52) U.S. Cl. ......................... 166/194; 166/195; 521/54; 521/135; 521/178; 523/219

(58) Field of Search ........................ 521/54, 135, 178; 523/219; 166/294, 295

(56) References Cited

U.S. PATENT DOCUMENTS

| 2,815,079 | 12/1957 | Goins, Jr. et al. ............... 166/29 |
| 3,082,823 | 3/1963 | Hower ............................. 166/29 |
| 3,208,525 | 9/1965 | Caldwell et al. ................. 166/33 |
| 3,310,111 | 3/1967 | Pavlich et al. .................. 166/33 |
| 3,416,604 | 12/1968 | Rensvold ........................ 166/33 |
| 3,467,208 | 9/1969 | Kelly ............................. 175/72 |
| 3,612,181 | 10/1971 | Brooks, Jr. ..................... 166/295 |
| 3,750,768 | 8/1973 | Suman, Jr. et al. ............. 175/72 |
| 3,782,466 | 1/1974 | Lawson et al. ................. 166/254 |
| 3,894,977 | 7/1975 | Brown et al. ................. 260/18 EP |
| 3,933,204 | 1/1976 | Knapp ............................ 166/292 |
| 3,960,801 | 6/1976 | Cole et al. ................. 260/33.6 EP |
| 3,976,135 | 8/1976 | Anderson ........................ 166/276 |
| 4,042,031 | 8/1977 | Knapp ............................ 166/276 |
| 4,042,032 | 8/1977 | Anderson et al. ............... 166/276 |
| 4,072,194 | 2/1978 | Cole et al. ..................... 166/295 |
| 4,101,474 | 7/1978 | Copeland et al. ................ 260/13 |
| 4,107,112 | 8/1978 | Latta, Jr. et al. ............ 260/18 EP |
| 4,113,015 | 9/1978 | Meijs ............................ 166/295 |
| 4,127,173 | 11/1978 | Watkins et al. ................. 166/276 |
| 4,189,002 | 2/1980 | Martin ........................... 166/295 |
| 4,199,484 | 4/1980 | Murphey ......................... 260/13 |
| 4,215,001 | 7/1980 | Elphingstone et al. ......... 252/8.55 C |
| 4,216,829 | 8/1980 | Murphey ......................... 166/276 |
| 4,220,566 | 9/1980 | Constien et al. ................ 260/13 |
| 4,272,384 | 6/1981 | Martin ........................ 252/8.55 R |
| 4,336,842 | 6/1982 | Graham et al. .................. 166/276 |
| 4,339,000 | 7/1982 | Cronmiller ...................... 166/295 |
| 4,367,300 | 1/1983 | Aoki et al. ....................... 524/2 |
| 4,368,136 | 1/1983 | Murphey ......................... 252/316 |
| 4,483,888 | 11/1984 | Wu ................................ 427/336 |
| 4,489,785 | 12/1984 | Cole ............................. 166/295 |
| 4,532,052 | 7/1985 | Weaver et al. ............... 252/8.55 R |
| 4,537,918 | 8/1985 | Parcevaux et al. ............... 523/130 |
| 4,558,075 | 12/1985 | Suss et al. ..................... 523/216 |
| 4,620,993 | 11/1986 | Suss et al. ..................... 427/407.1 |
| 4,665,988 | 5/1987 | Murphey et al. .................. 166/295 |
| 4,741,401 | 5/1988 | Walles et al. ................... 166/300 |
| 4,751,249 | * 6/1988 | Wycech ............................ 521/54 |
| 4,773,482 | 9/1988 | Allison .......................... 166/270 |
| 4,785,884 | 11/1988 | Armbruster ...................... 166/280 |
| 4,829,100 | 5/1989 | Murphey et al. .................. 523/131 |
| 4,921,047 | 5/1990 | Summers et al. .................. 166/276 |
| 4,922,596 | * 5/1990 | Wycech ............................ 29/150 |
| 4,972,906 | 11/1990 | McDaniel ........................ 166/276 |
| 5,090,478 | 2/1992 | Summers ......................... 166/278 |
| 5,095,987 | 3/1992 | Weaver et al. ................... 166/276 |
| 5,107,928 | 4/1992 | Hilterhaus ....................... 166/293 |
| 5,133,409 | 7/1992 | Bour et al. ...................... 166/293 |
| 5,159,980 | 11/1992 | Onan et al. ..................... 166/294 |
| 5,162,060 | 11/1992 | Bredow et al. ................... 106/809 |
| 5,168,928 | 12/1992 | Terry et al. ..................... 166/292 |
| 5,211,234 | 5/1993 | Floyd ............................. 166/276 |
| 5,213,161 | 5/1993 | King et al. ...................... 166/293 |

(List continued on next page.)

FOREIGN PATENT DOCUMENTS

| 0 091 377 A | 10/1983 | (EP) | ............... E21B/33/13 |
| 522931 | 1/1993 | (EP) | . |
| 0 553 566 A1 | 8/1993 | (EP) | ............... C21B/43/04 |
| 786439 | 7/1997 | (EP) | . |
| 0 802 253 A1 | 10/1997 | (EP) | ............... C09K/7/02 |
| 1315462 | 12/1962 | (FR) | . |
| 1019122 | 2/1966 | (GB) | ............... E02D/3/14 |
| 05032444 | 2/1993 | (JP) | . |

OTHER PUBLICATIONS

Halliburton Services Cementing Technical Data Brochure entitled: "Spherelite™ Low Density Cement".

3M Glass Bubbles Brochure entitled: "Formulating And Cost Comparison Guide" pp. 2–5.

Abstract No. XP002146282 dated Oct. 15, 1982; Derwent Publications, Ltd.

Abstract No. XP002146283 dated Oct. 12, 1977; Derwent Publications, Ltd.

Abstract No. XP002145741 dated Mar. 12, 1996; Derwent Publications, Ltd.

Abstract No. XP002145742 dated Apr. 15, 1993; Derwent Publications, Ltd.

Paper entitled "Conditioning of Spent Ion Exchange Resins By Embedding In Compound Matrixes", C.J. Kertesz; Waste Management, Tuscon, AZ, 1991, vol. 2, 381–6.

*Primary Examiner*—Morton Foelak
(74) *Attorney, Agent, or Firm*—Craig W. Roddy; C. Clark Dougherty, Jr.

(57) ABSTRACT

The present invention provides heat insulation compositions and methods. The compositions are basically comprised of an epoxide containing liquid, an insulating material and an epoxide hardening agent.

11 Claims, No Drawings

U.S. PATENT DOCUMENTS

| | | | |
|---|---|---|---|
| 5,232,961 | 8/1993 | Murphey et al. | 523/414 |
| 5,293,938 | 3/1994 | Onan et al. | 166/293 |
| 5,314,023 | 5/1994 | Dartez et al. | 166/295 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,363,918 | 11/1994 | Cowan et al. | 166/295 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,388,648 | 2/1995 | Jordan et al. | 166/380 |
| 5,428,178 | 6/1995 | Zuzich et al. | 549/378 |
| 5,453,453 * | 9/1995 | Lamon | 521/54 |
| 5,458,195 | 10/1995 | Totten et al. | 166/293 |
| 5,547,027 | 8/1996 | Chan et al. | 166/295 |
| 5,559,086 | 9/1996 | Dewprashad | 507/219 |
| 5,648,401 * | 7/1997 | Czaplicki et al. | 521/85 |
| 5,660,901 * | 8/1997 | Wong | 264/51 |
| 5,665,787 * | 9/1997 | Nowak et al. | 521/54 |
| 5,692,566 | 12/1997 | Surles | 166/295 |
| 5,837,739 * | 11/1998 | Nowak et al. | 521/54 |
| 5,873,413 | 2/1999 | Chatterji et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |
| 5,911,282 | 6/1999 | Onan et al. | 175/75 |
| 5,913,364 | 6/1999 | Sweatman | 166/281 |
| 5,957,204 | 9/1999 | Chatterji et al. | 166/295 |
| 5,969,006 | 10/1999 | Onan et al. | 523/166 |
| 6,006,835 | 12/1999 | Onan et al. | 166/295 |
| 6,006,836 | 12/1999 | Chatterji et al. | 166/295 |
| 6,059,035 | 5/2000 | Chatterji et al. | 166/293 |
| 6,098,711 | 8/2000 | Chatterji et al. | 166/294 |
| 6,124,246 | 9/2000 | Heathman et al. | 507/219 |

* cited by examiner

HEAT INSULATION COMPOSITIONS AND METHODS

BACKGROUND OF THE INVENTION

1. Field of the Invention

The present invention relates generally to heat insulation compositions and methods, and more particularly, to epoxide insulation compositions and methods of using the compositions for insulating fluid containers such as pipe.

2. Description of the Prior Art

Fluid containers such as vessels and pipes are often insulated whereby the fluids therein do not readily gain or lose heat by heat transfer through the walls of the container. Insulated pipelines and pipeline bundles made up of one or more pipelines positioned within a larger diameter outer sleeve have been developed and used heretofore. Such pipelines are commonly utilized for transporting oil and gas produced from wells underwater or underground. The pipelines have heretofore been insulated by filling the spaces between the pipelines and the outer sleeves with insulating compositions such as foamed hydraulic cement compositions.

When a foamed hydraulic cement composition is utilized as insulation between a pipeline and an outer sleeve, the cement sheath formed is subjected to various shear and compressional stresses during the life of the pipeline. For example, when pressures and/or temperatures, the pipeline expands both radially and longitudinally which places stresses on the cement sheath often causing cracks and loss of insulation properties therein. Another stress condition and loss of cement sheath insulation properties results from water being trapped in channels or pockets therein and from exceedingly high pressures which occur inside the cement sheath due to thermal expansion of the water. The thermal expansion often occurs as a result of high temperature differentials created during fluid production which cause the water to be vaporized and create high pressures. The high pressures can exceed the collapse pressure of the pipeline and/or cause leaks in the outer sleeve. Still other conditions occur which cause loss of insulation properties as a result of the stresses exerted on the completed pipeline, cement composition and outer sleeve during the transport, installation or other movements of the pipeline.

Thus, there is a continuing need for improved heat insulation compositions which are resilient whereby they can resist failure as a result of movements of the insulated container to which they are applied.

SUMMARY OF THE INVENTION

The present invention provides improved heat insulation compositions and methods which meet the needs described above and overcome the shortcomings of the prior art. The improved heat insulation compositions of this invention are basically comprised of an epoxide containing liquid, an insulating material and an epoxide hardening agent. Upon hardening, the compositions provide good insulation properties whereby a minimum of heat transfer takes place through the walls of the fluid containers to which they are applied and the compositions are highly flexible whereby they resist failure as a result of container movements caused by expansion, contraction and the like. For example, when the insulating compositions of this invention are applied to underwater gas or oil pipelines, the insulating properties of the compositions prevent condensation of the gas or precipitation of paraffins from the oil in the pipelines while the highly resilient nature of the compositions prevents failures due to pipe movements.

The methods of this invention basically comprise the steps of preparing an insulation composition comprised of an epoxide containing liquid, an insulating material and an epoxide hardening agent, placing the insulation composition adjacent to the surfaces of a fluid container, and then allowing the insulation composition to harden.

It is, therefore, a general object of the present invention to provide improved heat insulation compositions and methods of heat insulating a fluid container therewith.

Other and further objects, features and advantages of the present invention will be readily apparent to those skilled in the art upon a reading of the description of preferred embodiments which follows.

DESCRIPTION OF PREFERRED EMBODIMENTS

As mentioned, the present invention provides improved heat insulation compositions and methods. The insulation compositions provide good insulation properties whereby very little heat transfer takes place into or from a fluid container such as a vessel or pipeline insulated therewith. In addition, the heat insulation compositions of this invention are highly resilient and therefore do not fail as a result of movements of the insulated fluid container. The insulation compositions and methods of this invention are particularly suitable for insulating pipelines through which hydrocarbons from oil and gas wells are flowed.

The heat insulation compositions of the present invention which have good insulation properties and are highly resilient after hardening are comprised of an epoxide containing liquid, an insulating material and an epoxide hardening agent. While various epoxide containing liquids can be utilized, a preferred such liquid is comprised of a liquid epoxy resin and a diluent. Liquid epoxy resins produced from epichlorohydrin and bisphenol A (4,4'-isopropylidenediphenol) are readily available and are suitable for producing a pumpable composition which hardens into an impermeable, high strength solid. Particularly suitable such liquid epoxy resins have molecular weights in the range of from about 200 to about 1,000 and have a one gram equivalent of epoxide per about 100 to 200 grams of epoxy resin. A more preferred such liquid epoxy resin has a molecular weight of about 340, a one gram equivalent of epoxide per about 185 to 192 grams of resin and a viscosity at 25° C. of about 100 to 160 poises. A liquid epoxy resin having these properties is commercially available under the trade name "EPON® 828" from Shell Chemical Company of Houston, Tex.

The liquid diluent is included in the liquid epoxy resin so that it will have a low enough viscosity to be pumpable. A hydrocarbon diluent which can be utilized is comprised of aromatic hydrocarbons having the formula $C_6H_2(R)_4$ wherein R is hydrogen or a straight or branched chain alkyl radical having from 1 to 3 carbon atoms with at least one, and more preferably two, of the R's being alkyl radicals. Examples of such aromatic hydrocarbons include, but are not limited to, toluene, ethylbenzene, n-propylbenzene, isopropylbenzene, n-butylbenzene, isobutylbenzene, cyclohexylbenzene, n-hexylbenzene, xylene, diethylbenzene, 2-chloro-p-xylene, diisopropylbenzene, 2-nitro-p-xylene, cymene, durene, isodurene, trimethylbenzene, triethylbenzene, dibutylbenzene, pentamethylbenzene, 1-pentyl-3-ethylbenzene, p-pentyltoluene, 1-hexyl-3-isobutylbenzene, m-hexyltoluene, 1-heptyl-3- isopropylbenzene, p-heptyltoluene, 1-heptyl-3-ethylbenzene, 1-octyl-3-butylbenzene, 1-octyl-3-propylbenzene, p-octyltoluene, 1-nonyl-3-ethylbenzene, p-nonyltoluene, 1-dodecyl-3-ethylbenzene, p-isodecyltoluene, 1-decyl-3-isotridecylbenzene and mixtures thereof.

A particularly suitable diluent which is presently preferred is comprised of a mixture of hydrocarbons containing from about 50% to about 75% of one or more of the above described aromatic hydrocarbons by weight of the diluent. A preferred such diluent is commercially available under the trade name "CYCLO SOL® 63" from Shell Chemical Company of Houston, Texas. When utilized, the liquid hydrocarbon diluent is mixed with the liquid epoxy resin in an amount in the range of from about 25% to about 50% by weight of the epoxy resin. More preferably, the diluent is mixed with the epoxy resin in an amount of about 27% by weight of the epoxy resin.

Another diluent which can be utilized in lieu of the above described hydrocarbon diluent is a low viscosity epoxide containing liquid. Preferred such low viscosity epoxide containing liquids are the diglycidyl ether of 1,4-butanediol, the diglycidyl ether of neopentyl glycol, the diglycidyl ether of cyclohexane dimethanol and mixtures thereof. A suitable epoxide containing liquid comprised of the diglycidyl ether of 1,4-butanediol is commercially available from the Shell Chemical Company under the trade name "HELOXY® 67." This epoxide containing liquid has a viscosity at 25° C. in the range of from about 13 to about 18 centipoises, a molecular weight of 202 and a 1 gram equivalent of epoxide per about 120 to about 130 grams of the liquid. A suitable diglycidyl ether of neopentyl glycol is commercially available from Shell Chemical Company under the trade designation "HELOXY® 68." This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexane dimethanol is commercially available from Shell Chemical Company under the trade designation "HELOXY® 107." This epoxide containing liquid has a viscosity at 25° C. in the range of from about 55 to about 75 centipoises, a molecular weight of 256 and a one gram equivalent of epoxide per about 155 to about 165 grams of liquid.

When one or more of the low viscosity epoxide containing liquids are utilized as a diluent for the above described high viscosity liquid epoxy resin, the epoxide containing liquid or liquids are mixed with the liquid epoxy resin in an amount in the range of from about 10% to about 30% by weight of the liquid epoxy resin, preferably in an amount of about 20%.

One or more of the above described low viscosity epoxide containing liquids can also be substituted for the higher viscosity epoxide containing liquid comprised of liquid epoxy resin and diluent described above. The determination of which epoxide containing liquid should be used depends upon the particular application of the heat insulation composition, the particular insulating material used and whether or not the heat insulation composition is to be pumped.

Various insulating materials can be utilized in accordance with this invention. One preferred such material is comprised of hollow inorganic spheres containing air which provide heat insulation characteristics to the composition. Suitable hollow inorganic spheres are commercially available under the trade designation "GLASS BUBBLES™" from the 3M Company of St. Paul, Minn. More preferred hollow inorganic spheres which are formed of fly ash are commercially available under the trade designation "SPHERELITE™" from Halliburton Energy Services, Inc. of Duncan, Okla. When used, the hollow inorganic spheres are included in a heat insulation composition of this invention in an amount in the range of from about 50% to about 100% by weight of epoxide containing liquid in the composition.

Another preferred insulating material which can be utilized in the heat insulation compositions of this invention is a gas, e.g., nitrogen or air, present in an amount sufficient to form a foam, i.e., an amount in the range of from about 10% to about 60% by weight of the compositions, more preferably from about 10% to about 30%. The presence of gas bubbles in the foamed compositions functions to provide heat insulating properties to the compositions.

When an insulation composition of this invention is foamed, a foaming agent is preferably included in the composition in an amount sufficient to facilitate the formation of the foam. Also, a foam stabilizer is preferably included in the composition in an amount sufficient to stabilize the foam after it is formed. While various surfactants which function as foaming agents can be utilized in accordance with this invention, a preferred such surfactant is comprised of an alcohol ether sulfate and is commercially available under the trade designation "HOWCO SUDS™" from Halliburton Energy Services, Inc. of Duncan, Oklahoma. When used, the foaming agent is included in a composition of this invention in an amount in the range of from about 2.5% to about 10% by weight of epoxide containing liquid in the composition.

A variety of surfactants which function as foam stabilizers can also be utilized in accordance with the present invention. One particularly suitable such foam stabilizer is an amidopropylbetaine which is commercially available under the trade designation "HC-2 " from Halliburton Energy Services, Inc. of Duncan, Okla. Another particularly suitable foam stabilizer which can be utilized is a methoxypolyethylene glycol which is commercially available under the trade designation "CARBOWAX™" from the Union Carbide Company of Danbury, Conn. When used, the foam stabilizing surfactant is included in a composition of this invention in an amount in the range of from about 0.825% to about 3.3% by weight of the epoxide containing liquid in the composition.

A variety of epoxide containing liquid hardening agents can be utilized in accordance with the present invention, including, but not limited to, aliphatic amines, aliphatic tertiary amines, aromatic amines, cycloaliphatic and heterocyclic amines, amido amines, polyamides, polyethyl amines and carboxylic acid anhydrides. Examples of suitable aliphatic and aromatic amines are triethylenetetraamine, ethylenediamine, N-cocoalkyltrimethylenediamine, isophoronediamine, diethyltoluenediamine and tris (dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of the above mentioned epoxide hardening agents, triethylenetetraamine, ethylenediamine, N-cocoalkyltrimethylenediamine, isophoronediamine, diethyltoluenediamine, tris(dimethylaminomethylphenol) and mixtures thereof are preferred, with isophoronediamine, diethyltoluenediamine, tris(dimethylaminomethylphenol) and mixtures thereof being the most preferred. The epoxide hardening agent or agents utilized are included in the heat insulation compositions of the present invention in an amount in the range of from about 10% to about 35% by weight of the epoxide containing liquid in the compositions.

A preferred heat insulation composition of the present invention includes an epoxide containing liquid comprising a liquid epoxy resin which is a condensation product of epichlorohydrin and bisphenol A and a hydrocarbon diluent containing one or more aromatic hydrocarbons having the formula $C_6H_2(R)_4$ wherein R is hydrogen or a straight or branched chain alkyl radical having from 1 to 3 carbon atoms with at least one, and preferably two, of the R's being alkyl radicals, the hydrocarbon diluent being mixed with the liquid epoxy resin in an amount in the range of from about 25% to about 50% by weight of the liquid epoxy resin; an insulating material comprised of hollow inorganic spheres present in an amount in the range of from about 50% to about 100% by weight of the epoxide containing liquid in the composition; and an epoxide hardening agent selected from the group of aliphatic amines, aromatic amines, amide amines, amido amines, imidazoles and carboxylic acid anhydrides present in an amount in the range of from about 10% to about 35% by weight of epoxide containing liquid in the composition.

Another preferred heat insulation composition of this invention is comprised of an epoxide containing liquid selected from the group consisting of the diglycidyl ether of 1,4-butanediol, the diglycidyl ether of neopentyl glycol, the diglycidyl ether of cyclohexane dimethanol and mixtures thereof; an insulating material comprised of hollow inorganic spheres present in an amount in the range of from about 50% to about 100% by weight of the epoxide containing liquid in the composition; and an epoxide hardening agent selected from the group consisting of aliphatic amines, aromatic amines, amide amines, amido amines, imidazoles and carboxylic acid anhydrides present in an amount in the range of from about 10% to about 35% by weight of epoxide containing liquid in the composition.

Yet another preferred heat insulation composition of this invention includes an epoxide containing liquid comprising a liquid epoxy resin which is the condensation product of epichlorohydrin and bisphenol A and a hydrocarbon diluent containing one or more aromatic hydrocarbons having the formula $C_6H_2(R)_4$ wherein R is hydrogen or a straight or branched chain alkyl radical having from 1 to 3 carbon atoms with at least one, and preferably two, of the R's being alkyl radicals, the hydrocarbon diluent being mixed with the liquid epoxy resin in an amount in the range of from about 25% to about 50% by weight of the liquid epoxy resin; an insulating material comprising a gas present in an amount sufficient to form a foam; a foaming agent comprising an alcohol ether sulfate surfactant present in an amount in the range of from about 1.65% to about 6.6% by weight of epoxide containing liquid in the composition; a foam stabilizer comprising a methoxypropylene glycol surfactant present in an amount in the range of from about 0.875% to about 3.3% by weight of epoxide containing liquid in the composition; and an epoxide hardening agent comprising at least one member selected from the group of aliphatic amines, aromatic amines, amide amines, amido amines, imidazoles and carboxylic acid anhydrides present in an amount in the range of from about 10% to about 35% by weight of epoxide containing liquid in the composition.

Still another preferred heat insulation composition of this invention is comprised of an epoxide containing liquid selected from the group of the diglycidyl ether of 1,4-butanediol, the diglycidyl ether of neopentyl glycol, the diglycidyl ether of cyclohexanedimethanol and mixtures thereof; an insulating material comprising a gas present in an amount sufficient to form a foam; a foaming agent comprising an alcohol ether sulfate surfactant present in an amount in the range of from about 1.65% to about 6.6% by weight of epoxide containing liquid in the composition; a foam stabilizer comprising an amidopropylbetaine surfactant present in an amount in the range of from about 0.875% to about 3.3% by weight of epoxide containing liquid in the composition; and an epoxide hardening agent comprising at least one member selected from the group of aliphatic amines, aromatic amines, amide amines, amido amines, imidazoles and carboxylic acid anhydrides present in an amount in the range of from about 10% to about 35% by weight of epoxide containing liquid in the composition.

The most preferred heat insulation composition of this invention is comprised of an epoxide containing liquid selected from the group of the diglycidyl ether of 1,4-butanediol, the diglycidyl ether of neopentyl glycol, the diglycidyl ether of cyclohexanedimethanol and mixtures thereof; an insulating material comprising a gas present in an amount sufficient to form a foam; a foaming agent comprising an alcohol ether sulfate surfactant present in an amount in the range of from about 1.65% to about 6.6% by weight of epoxide containing liquid in the composition; a foam stabilizer comprising an amidopropylbetaine surfactant present in an amount in the range of from about 0.875% to about 3.3% by weight of epoxide containing liquid in the composition; and an epoxide hardening agent selected from the group of triethylenetetraamine, ethylendiamine, N-cocoalkyltrimethylenediamine, isophoronediamine, diethyltoluenediamine, tris(dimethylaminomethylphenol) and mixtures thereof present in an amount in the range of from about 10% to about 35% by weight of epoxide containing liquid in the composition.

The methods of the present invention for heat insulating a container such as a fluid containing vessel or pipeline are basically comprised of the steps of preparing a heat insulation composition of this invention as described above, placing the heat insulation composition adjacent to surfaces of the container and allowing the heat insulation composition to harden.

As mentioned above, the methods of this invention are particularly suitable for insulating pipelines used for transporting fluids underwater or underground such as oil and gas produced from wells. The heat insulation composition is placed adjacent to the outside surfaces of the pipeline and allowed to harden.

The heat insulation compositions and methods of this invention are also particularly suitable for insulating pipeline bundles comprised of one or more pipelines disposed within an outer sleeve. The heat insulation compositions can be pumped into the space between the pipelines and the outer sleeve and allowed to harden therein. The hardened heat insulation compositions provide excellent insulation properties and are resilient whereby they resist failures brought on by pipe movements due to expansion, contraction and the like.

In order to further illustrate the heat insulation compositions and methods of this invention, the following example is given.

EXAMPLE

A number of heat insulation compositions of the present invention were prepared having the components, quantities of components and densities shown in the Table below. Hardened specimens of the compositions were tested as described below to determine their thermal conductivities.

The thermal conductivity of a specimen is defined as the transfer of heat through a unit thickness, across a unit area and for a unit difference of temperature. The transfer of heat is expressed in British Thermal Units (BTUs), the thickness is 1 foot, the unit area is one square foot and the unit temperature difference is 1° F. The thermal conductivity test apparatus utilized in the tests measured the temperature drop from the inside diameter to the outside diameter of a test specimen with a known heat flow through the specimen.

$\pi$=3.141593

Ln=Natural log $d_o$=Outside diameter (feet) of the test specimen $d_i$=Inside diameter (feet) of the test specimen L=Length (feet) of the test specimen $\Delta T$=Differential temperature (° F.)

The results of these tests are also given in the Table below.

TABLE

Thermal Conductivity Tests

Insulation Composition Compounds and Amounts

| Composition No. | Epoxide Containing Liquid | Amount, parts by weight | Insulating Material | Amount, parts by weight | Epoxide Hardening Agent | Amount, parts by weight | Composition Density, lb/gal | Thermal Conductivity, BTU/hr · ft² · ° F./ft |
|---|---|---|---|---|---|---|---|---|
| 1 | diglycidyl ether of cyclohexane dimethanol[1] | 100 | hollow inorganic spheres[2] | 30 | triethylenetetraamine | 100 | 7.15 | 0.102 |
| 2 | diglycidyl ether of cyclohexane dimethanol[1] | 100 | hollow inorganic spheres[2] | 90 | diethylene-toluenediamine and tris(dimethyl-aminomethylphenol | 28<br><br>2 | 7.25 | 0.13 |
| 3 | diglycidyl ether of neopentyl glycol[3] | 100 | air[4] | — | diethylene-toluenediamine and tris(dimethylamino-methylphenol | 28<br><br>1.54 | 6.0 | 0.05 |

[1]"HELOXY ® 107" from Shell Chemical Company
[2]"SPHERELITE ™" from Halliburton Energy Services, Inc.
[3]"HELOXY ® 68" from Shell Chemical Company
[4]Composition foamed with air in the presence of an alcohol ether sulfate foaming agent and an amidopropylbetaine foam stabilizer.

The thermal conductivity test specimens consisted of a hollow brass mandrel surrounded by the hardened heat insulation composition tested which was contained on the outside by a section of thin wall tubing. Each thermal conductivity test was performed by inserting a tubular heater within the brass mandrel, placing a thermocouple in a small hole drilled into the brass mandrel from one end thereof to a center portion thereof (with the tip of the thermocouple at the center portion of the hardened test composition), placing insulating foam above and below the hardened insulation composition, and then sealing the ends of the hardened composition with silicone rubber sealant. A second thermocouple was attached to the outside of the thin wall outer tubing (the tip was placed directly across from the tip of the inside thermocouple) and the entire test specimen was placed in a constant temperature water bath at 170° F. A constant DC voltage was applied to the tubular heater and when the differential temperature between the inside and outside thermocouples reached equilibrium, readings were taken of the DC volts, the DC amperage and the differential temperature. This information was then used to calculate the thermal conductivity of each test specimen.

The following equation was utilized to calculate the thermal conductivities:

$$k = (DC\ volts) \times (Amps) \times (\pi) \times (Ln(d_o/d_i)/(2\pi) \times (L) \times (\Delta T)$$

wherein:

k=Thermal conductivity in Btu/hr·ft²·° F./ft

DC Volts=DC volts applied to the center tubular heater

Amps=DC amperage output from the heating element

From the Table it can be seen that the heat insulation compositions of this invention have good insulating properties.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of heat insulating a pipe comprising the steps of:

(a) preparing a pumpable heat insulation composition comprised of a liquid epoxy resin comprising a condensation product of epichlorohydrin and bisphenol A, a diluent selected from the group consisting of aromatic hydrocarbons and epoxide containing liquids, an insulating material comprised of hollow inorganic spheres present in an amount in the range of from about 50% to about 100% by weight of said liquid epoxy resin in said composition and an epoxy resin hardening agent which is at least one member selected from the group consisting of aliphatic amines, aromatic amines, amide amines, amido amines, imadazoles and carboxylic acid anhydrides present in an amount in the range of from about 10% to about 35% by weight of said liquid epoxy resin said composition;

(b) placing said insulation composition adjacent to surfaces of said pipe; and (c) allowing said insulation composition to harden.

2. The method of claim 1 wherein said diluent is comprised of one or more aromatic hydrocarbons having the formula $C_6H_2(R)_4$ wherein R is hydrogen or a straight or branched chain alkyl radical having from 1 to 3 carbon atoms with at least one of the R's being an alkyl radical, said diluent being present in an amount in the range of from about 25% to about 50% by weight of said liquid epoxy resin in said composition.

3. The method of claim 1 wherein said diluent is an epoxide containing liquid selected from the group of the diglycidyl ether of 1,4-butanediol, the diglycidyl ether of neopentyl glycol, the diglycidyl ether of cyclohexanedimethanol and mixtures thereof and is present in an amount in the range of from about 10% to about 30% by weight of said liquid epoxy resin in said composition.

4. A method of heat insulating a pipe comprising the steps of:
  (a) preparing a pumpable heat insulation composition comprising an epoxide containing liquid selected from the group of the diglycidyl ether of 1,4-butanediol, the diglycidyl ether of neopentyl glycol, the diglycidyl ether of cyclohexanedimethanol and mixtures thereof an insulating material comprised of hollow inorganic spheres present in an amount in the range of from about 50% to about 100% by weight of said epoxide containing liquid in said composition, and an epoxide hardening agent selected from the group consisting of aliphatic amines, aromatic amines, amide amines amido amines, imadazoles and carboxylic acid anhydrides present in an amount in the range of from about 10% to about 35% by weight of said epoxide containing liquid in said composition;
  (b) placing said insulation composition adjacent to the surfaces of said pipe; and
  (c) allowing said insulation composition to harden.

5. A method of heat insulating a pipe comprising the steps of:
  (a) preparing a pumpable heat insulation composition comprising an epoxide containing liquid selected from the group of the diglycidyl ether of 1,4-butanediol, the diglycidyl ether of neopentyl glycol, the diglvcidyl ether of cyclohexanedimethanol and mixtures thereof an insulating material comprised of hollow inorganic spheres present in an amount in the range of from about 50% to about 100% by weight of said epoxide containing liquid in said composition and an epoxide hardening agent selected from the group consisting of triethylenetetraamine, ethylenediamine, N-cocoalkyltrimethylenediamine, isophoronediamine, diethyltoluenediamine and tris(dimethylaminophenol);
  (b) placing said insulation composition adjacent to surfaces of said pipe, and
  (c) allowing said insulation composition to harden.

6. A method of heat insulating a pipe comprising the steps of:
  (a) preparing a pumpable heat insulation composition comprised of a liquid epoxy resin comprising a condensation product of epichlorohydrin and bisphenol A, a diluent selected from the group consisting of aromatic hydrocarbons and epoxide containing liquids, an insulating material comprising a gas present in an amount sufficient to form a foam, a foaming agent comprising an alcohol ether sulfate surfactant present in an amount in the range of from about 1.65% to about 6.6% by weight of said epoxy resin in said composition, a foam stabilizer comprising a methoxypropylene glycol surfactant present in an amount in the range of from about 0.875% to about 3.3% by weight of said epoxy resin in said composition and an epoxy resin hardening agent which is at least one member selected from the group consisting of aliphatic amines, aromatic amines, amide amines, amido amines, imidazoles and carboxylic acid anhydrides present in an amount in the range of from about 10% to about 35% by weight of said epoxy resin in said composition;
  (b) placing said insulation composition adjacent to the surfaces of said pipe; and
  (c) allowing said insulation composition to harden.

7. The method of claim 6 wherein said diluent is comprised of one or more aromatic hydrocarbons having the formula $C_6H_2(R)_4$ wherein R is hydrogen or a straight or branched chain alkyl radical having from 1 to 3 carbon atoms with at least one of the R's being an alkyl radical, said diluent being present in an amount in the range of from about 25% to about 50% by weight of said epoxy resin in said composition.

8. The method of claim 6 wherein said diluent is an epoxide containing liquid selected from the group of diglycidyl ether of 1,4-butanediol, the diglycidyl ether of neopentyl glycol, the diglycidyl ether of cyclohexanedimethanol and mixtures thereof present in an amount in the range of from about 10% to about 30% by weight of said epoxy resin in said composition.

9. The method of claim 6 wherein said hardening agent is selected from the group of triethylenetetraamine, ethylenediamine, N-cocoalkyltrimethylenediamine, isophoronediamine, diethyltoluenediamine and tris (dimethylaminophenol).

10. A method of heat insulating a container comprising the steps of:
  (a) preparing a pumpable heat insulation composition comprising an epoxide containing liquid selected from the group consisting of the diglycidyl ether of 1,4-butanediol, the diglycidyl ether of neopentyl glycol, the diglycidyl ether of cyclohexanedimethanol and mixtures thereof, an insulating material comprising a gas present in an amount sufficient to form a foam, a foaming agent comprising an alcohol ether sulfate surfactant present in an amount in the range of from about 1.65% to about 6.6% by weight of said epoxide containing liquid in said composition, a foam stabilizer comprising an amidopropylbetaine surfactant present in an amount in the range of from about 0.875% to about 3.3% by weight of said epoxide containing liquid in said composition and an epoxide hardening agent comprising at least one member selected from the group consisting of aliphatic amines, aromatic amines, amide amines, amido amines, imidazoles and carboxylic acid anhydrides present in an amount in the range of from about 10% to about 35% by weight of said epoxide containing liquid in said composition;
  (b) placing said insulation composition adjacent to the surfaces of said pipe; and
  (c) allowing said insulation composition to harden.

11. The method of claim 10 wherein said hardening agent is selected from the group of triethylenetetraamine, ethylenediamine, N-cocoalkyltrimethylenediamine, isophoronediamine, diethyltoluenediamine and tris (dimethylaminophenol).

* * * * *